United States Patent
Lin (10) Patent No.: US 10,785,729 B2
(45) Date of Patent: Sep. 22, 2020

(54) METHOD AND DEVICE FOR CONTROLLING UPLINK POWER

(71) Applicant: GUANGDONG OPPO MOBILE TELECOMMUNICATIONS CORP., LTD., Dongguan, Guangdong (CN)

(72) Inventor: Yanan Lin, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/439,982

(22) Filed: Jun. 13, 2019

(65) Prior Publication Data
US 2019/0297583 A1   Sep. 26, 2019

Related U.S. Application Data

(63) Continuation of application No. PCT/CN2016/112421, filed on Dec. 27, 2016.

(30) Foreign Application Priority Data

Dec. 13, 2016 (WO) ............... PCT/2016/109652

(51) Int. Cl.
*H04W 52/14* (2009.01)
*H04W 52/10* (2009.01)
(Continued)

(52) U.S. Cl.
CPC ........ *H04W 52/146* (2013.01); *H04W 52/04* (2013.01); *H04W 52/10* (2013.01); *H04W 52/14* (2013.01); *H04W 52/228* (2013.01)

(58) Field of Classification Search
CPC ..... H04W 52/04; H04W 52/10; H04W 52/14; H04W 52/146; H04W 52/228; H04W 52/242; H04W 52/367
(Continued)

(56) References Cited

U.S. PATENT DOCUMENTS 10,264,534 B1 *  4/2019  Park ............... H04W 52/242
2010/0004016 A1 *  1/2010  Yin ................. H04W 52/08
                                                           455/522
(Continued)

FOREIGN PATENT DOCUMENTS

CN   101567713 A   10/2009
CN   101860947 A   10/2010
(Continued)

OTHER PUBLICATIONS

International Search Report dated Mar. 30, 2017; PCT/CN2016/112421.
(Continued)

*Primary Examiner* — Tan H Trinh (57) ABSTRACT

The present application provides a method and a device for controlling uplink power. The method includes: receiving, by a terminal device, uplink power control information transmitted by a network device; determining, by the terminal device, according to the uplink power control information, a target power control parameter corresponding to a target transmission mode, where the target transmission mode is a target uplink multiple access mode, or a target uplink beam, or a target uplink precoding scheme, or a target transmission scheduling scheme; and determining, by the terminal device, according to the target power control parameter, target transmitting power for transmitting a target uplink signal using the target transmission mode. The method and the device for controlling uplink power provided in the present application can flexibly adjust the uplink transmitting power to meet the requirements of different transmission modes, and are suitable for a communication system supporting multiple transmission modes.

15 Claims, 4 Drawing Sheets

(51) Int. Cl.
*H04W 52/22* (2009.01)
*H04W 52/04* (2009.01)

(58) Field of Classification Search
USPC .......... 455/69, 522; 370/252, 311, 336, 329
See application file for complete search history.

(56) References Cited

U.S. PATENT DOCUMENTS

| | | | |
|---|---|---|---|
| 2010/0142455 A1* | 6/2010 | Imamura | H04W 52/146 370/329 |
| 2011/0243007 A1* | 10/2011 | Xiao | H04B 7/0447 370/252 |
| 2011/0306383 A1* | 12/2011 | Lee | H04W 52/146 455/522 |
| 2013/0058315 A1* | 3/2013 | Feuersanger | H04W 52/327 370/336 |
| 2014/0247796 A1 | 9/2014 | Ouchi et al. | |
| 2014/0315594 A1* | 10/2014 | Jeong | H04W 52/146 455/522 |
| 2015/0018030 A1 | 1/2015 | Park et al. | |
| 2016/0081078 A1* | 3/2016 | Qin | H04L 5/001 370/252 |
| 2016/0135128 A1* | 5/2016 | Lee | H04W 52/10 370/311 |
| 2016/0323834 A1* | 11/2016 | Rahman | H04W 52/146 |
| 2018/0139706 A1* | 5/2018 | Li | H04W 52/242 |
| 2018/0332540 A1* | 11/2018 | Lou | H04W 74/006 |
| 2019/0150097 A1* | 5/2019 | Seo | H04W 72/0473 370/329 |
| 2019/0215784 A1* | 7/2019 | Hwang | H04L 5/00 |
| 2019/0297582 A1* | 9/2019 | Lin | H04W 52/10 |
| 2019/0297587 A1* | 9/2019 | Lin | H04W 72/0446 |

FOREIGN PATENT DOCUMENTS

| | | |
|---|---|---|
| CN | 102014468 A | 4/2011 |
| CN | 102239733 A | 11/2011 |
| CN | 102783226 A | 11/2012 |
| CN | 103096448 A | 5/2013 |
| CN | 103312484 A | 9/2013 |
| CN | 105307254 A | 2/2016 |
| EP | 1605605 A2 | 12/2005 |
| EP | 2741550 A1 | 6/2014 |
| RU | 2472318 C2 | 1/2013 |
| WO | 2008102829 A1 | 8/2008 |
| WO | 2010/005236 A2 | 1/2010 |
| WO | 2010005236 A2 | 1/2010 |

OTHER PUBLICATIONS

Extended European Search Report dated Oct. 21, 2019, Appln. No. 16923811.0.
The Chinese First Examination Report of corresponding Chinese application No. 201680091423.6, dated Mar. 26, 2020.
The Russian First Examination Report of corresponding Russian application No. 2019121866, dated Mar. 2, 2020.
The Chinese First Examination Report of corresponding Chinese application No. 201680091532.8, dated Mar. 4, 2020.
Samsung, 3GPP TSG RAN WG1 Meeting #87 R1-1612518; UL power control aspects, published on Nov. 18, 2016.
The Second Office Action of corresponding Chinese application No. 201680091532.8, dated May 25, 2020.
The first Office Action of corresponding Chilean application No. 201901621, dated May 14, 2020.
The first Office Action of corresponding Chilean application No. 201901620, dated May 14, 2020.
The Final rejection corresponding U.S. Appl. No. 16/439,272, dated Jun. 26, 2020.
The First Office Action of corresponding Canadian application No. 3046831, dated Jul. 3, 2020.

* cited by examiner

A network device determines uplink power control information, where the uplink power control information is used for a terminal device to determine a target power control parameter corresponding to a target transmission mode, and to determine, according to the target power control parameter, target transmitting power for transmitting a target uplink signal using the target transmission mode, where the target transmission mode is a target uplink multiple access mode, or the target transmission mode is a target uplink beam, or the target transmission mode is a target uplink precoding scheme, or the target transmission mode is a target transmission scheduling scheme — S210

The network device transmits the uplink power control information to the terminal device — S220

A network device determines uplink power control information, where the uplink power control information is used for a terminal device to determine a target power control parameter corresponding to a target transmission mode, and to determine, according to the target power control parameter, target transmitting power for transmitting a target uplink signal using the target transmission mode, where the target transmission mode is a target uplink multiple access mode, or the target transmission mode is a target uplink beam, or the target transmission mode is a target uplink precoding scheme, or the target transmission mode is a target transmission scheduling scheme — S210

The network device transmits the uplink power control information to the terminal device — S220

The network device receives the target uplink signal transmitted by the terminal device using the target transmission mode and the target transmitting power — S230

METHOD AND DEVICE FOR CONTROLLING UPLINK POWER

CROSS-REFERENCE TO RELATED APPLICATIONS

The present application is a continuation of International Application No. PCT/CN2016/112421, filed on Dec. 27, 2016, which claims priority to PCT Patent Application No. PCT/CN2016/109652, entitled "Method and Device for Controlling Uplink Power", filed on Dec. 13, 2016. The disclosures of the aforementioned applications are hereby incorporated by reference in their entireties.

TECHNICAL FIELD

Embodiments of the present application relate to the field of communications, and more particularly, to a method and a device for controlling uplink power.

BACKGROUND

Uplink transmitting power in a Long Term Evolution (LTE) system is determined by a terminal device according to power control parameters configured on a network side and a downlink path loss measured by the terminal device. In the uplink transmission of a future wireless communication system, multiple different uplink transmission modes will be introduced, such as multiple uplink multiple access modes, or using multiple different beams to transmit uplink signals, or using multiple precoding schemes, or using multiple transmission scheduling schemes, while the methods for performing uplink power control in the related prior art cannot meet the requirements of different uplink transmission modes. It is therefore desirable to provide a method for controlling uplink power that could be used in a communication system supporting multiple different uplink transmission modes.

SUMMARY

The present application provides a method and a device for controlling uplink power, which can flexibly adjust uplink transmitting power to meet the requirements of different transmission modes, and are suitable for a communication system supporting multiple transmission modes.

In a first aspect, a method for controlling uplink power is provided, including: receiving, by a terminal device, uplink power control information transmitted by a network device; determining, by the terminal device, according to the uplink power control information, a target power control parameter corresponding to a target transmission mode, where the target transmission mode is a target uplink multiple access mode, or the target transmission mode is a target uplink beam, or the target transmission mode is a target uplink precoding scheme, or the target transmission mode is a target transmission scheduling scheme; and determining, by the terminal device, according to the target power control parameter, target transmitting power for transmitting a target uplink signal using the target transmission mode.

In the method for controlling uplink power according to the present application, the terminal device determines the target power control parameter corresponding to the target transmission mode according to the received uplink power control information transmitted by the network device. Therefore, when the terminal device uses different transmission modes for uplink signal transmission, an independent uplink power control process can be used to determine the uplink transmitting power corresponding to the transmission mode. The uplink transmitting power can be flexibly adjusted to meet the requirements of different transmission modes, and the method is suitable for a communication system supporting multiple transmission modes.

With reference to the first aspect, in an implementation of the first aspect, the target transmission mode is one of multiple transmission modes.

With reference to the first aspect and the above implementation, in another implementation of the first aspect, the target transmission mode is one of multiple candidate transmission modes for the terminal device to transmit the target uplink signal, or the target transmission mode is a transmission mode required for the terminal device to transmit the target uplink signal.

With reference to the first aspect and the above implementations, in another implementation of the first aspect, the uplink power control information includes open-loop power control information, where the open-loop power control information includes open-loop power control parameters corresponding to multiple transmission modes including the target transmission mode;

where the determining, by the terminal device, according to the uplink power control information, a target power control parameter corresponding to the target transmission mode includes: determining, by the terminal device, according to the open-loop power control information, a target open-loop power control parameter corresponding to the target transmission mode from the open-loop power control parameters.

With reference to the first aspect and the above implementations, in another implementation of the first aspect, the receiving, by the terminal device, the uplink power control information transmitted by the network device includes: receiving, by the terminal device, the open-loop power control information which is transmitted by the network device through a Radio Resource Control (RRC) message.

With reference to the first aspect and the above implementations, in another implementation of the first aspect, the target open-loop power control parameter includes at least one of the following parameters: uplink objective receiving power, a path loss factor, and a Sounding Reference Signal (SRS) power adjustment value.

With reference to the first aspect and the above implementations, in another implementation of the first aspect, the uplink power control information includes power adjustment indication information;

where the determining, by the terminal device, according to the uplink power control information, the target power control parameter corresponding to the target transmission mode in the multiple transmission modes includes: determining, by the terminal device, according to the power adjustment indication information and a preset correspondence, a target closed-loop power adjustment value corresponding to the target transmission mode, where the preset correspondence is a correspondence between the power adjustment indication information and a closed-loop power adjustment value.

With reference to the first aspect and the above implementations, in another implementation of the first aspect, the determining, by the terminal device, according to the power adjustment indication information and the preset correspondence, the target closed-loop power adjustment value corresponding to the target transmission mode includes: determining, by the terminal device, a target correspondence from the preset correspondence according to the target transmission mode; and determining, by the terminal device, the target closed-loop power adjustment value according to the power adjustment indication information and the target correspondence.

With reference to the first aspect and the above implementations, in another implementation of the first aspect, the receiving, by the terminal device, the uplink power control information transmitted by the network device includes: receiving, by the terminal device, Downlink Control Information (DCI) transmitted by the network device, where the DCI includes the power adjustment indication information.

With reference to the first aspect and the above implementations, in another implementation of the first aspect, the target closed-loop power adjustment value is an adjustment value of the target transmitting power relative to first transmitting power, the first transmitting power is transmitting power used by the terminal device for transmitting an uplink signal of a same type as the target uplink signal for a previous time; or, the target closed-loop power adjustment value is an adjustment value of the target transmitting power relative to second transmitting power, the second transmitting power is transmitting power used by the terminal device for transmitting an uplink signal of a same type as the target uplink signal using the target transmission mode for a previous time; or, the target closed-loop power adjustment value is an adjustment value of the target transmitting power relative to third transmitting power, the third transmitting power is transmitting power—most recently determined by the terminal device—of an uplink signal of a same type as the target uplink signal; or, the target closed-loop power adjustment value is an adjustment value of the target transmitting power relative to fourth transmitting power, the fourth transmitting power is transmitting power—most recently determined by the terminal device—of an uplink signal which is transmitted using the target transmission mode and is of a same type as the target uplink signal; or, the target closed-loop power adjustment value is an adjustment value of the target transmitting power relative to fifth transmitting power, the fifth transmitting power is transmitting power of the target uplink signal determined by the terminal device according to the open-loop power control parameter corresponding to the target transmission mode.

With reference to the first aspect and the above implementations, in another implementation of the first aspect, the method further includes: transmitting, by the terminal device, the target uplink signal to the network device using the target transmission mode and the target transmitting power.

With reference to the first aspect and the above implementations, in another implementation of the first aspect, the target uplink signal is one of the following signals: a Physical Uplink Shared Channel (PUSCH), a Physical Uplink Control Channel (PUCCH), an SRS, and a De Modulation Reference Signal (DMRS).

With reference to the first aspect and the above implementations, in another implementation of the first aspect, the target uplink multiple access mode is one of the following multiple access modes: Discrete Fourier Transform Spread Orthogonal Frequency Division Multiplexing (DFT-S-OFDM), Cyclic Prefix-Orthogonal Frequency Division Multiplexing (CP-OFDM), Single-Carrier Frequency-Division Multiple Access (SC-FDMA), and Orthogonal Frequency Division Multiple Access (OFDMA).

In a second aspect, a method for controlling uplink power is provided, including: determining, by a network device, uplink power control information, where the uplink power control information is used for a terminal device to determine a target power control parameter corresponding to a target transmission mode and to determine, according to the target power control parameter, target transmitting power for transmitting a target uplink signal using the target transmission mode, where the target transmission mode is a target uplink multiple access mode, or the target transmission mode is a target uplink beam, or the target transmission mode is a target uplink precoding scheme, or the target transmission mode is a target transmission scheduling scheme; and transmitting, by the network device, the uplink power control information to the terminal device.

According to the method for controlling uplink power of the present application, the network device transmits the uplink power control information to the terminal device, so that the terminal device can determine the target power control parameter corresponding to the target transmission mode according to the received uplink power control information. Therefore, when the terminal device uses different transmission modes for uplink signal transmission, an independent uplink power control process can be used to determine the uplink transmitting power corresponding to the transmission mode. The uplink transmitting power can be flexibly adjusted to meet the requirements of different transmission modes, and the method is suitable for a communication system supporting multiple transmission modes.

With reference to the second aspect, in an implementation of the second aspect, the target transmission mode is one of multiple transmission modes.

With reference to the second aspect and the above implementation, in another implementation of the second aspect, the target transmission mode is one of multiple candidate transmission modes for the terminal device to transmit the target uplink signal, or the target transmission mode is a transmission mode required for the terminal device to transmit the target uplink signal.

With reference to the second aspect and the above implementations, in another implementation of the second aspect, the uplink power control information includes open-loop power control information, where the open-loop power control information includes open-loop power control parameters corresponding to multiple transmission modes including the target transmission mode, and the open-loop power control information is used for the terminal device to determine a target open-loop power control parameter corresponding to the target transmission mode from the open-loop power control parameters.

With reference to the second aspect and the above implementations, in another implementation of the second aspect, the transmitting, by the network device, the uplink power control information to the terminal device includes: transmitting, by the network device, the open-loop power control information to the terminal device through a Radio Resource Control (RRC) message.

With reference to the second aspect and the above implementations, in another implementation of the second aspect, the target open-loop power control parameter includes at least one of the following parameters: uplink objective receiving power, a path loss factor, and a Sounding Reference Signal (SRS) power adjustment value.

With reference to the second aspect and the above implementations, in another implementation of the second aspect, the uplink power control information includes power adjustment indication information, where the power adjustment indication information is used for the terminal device to determine, according to the power adjustment indication information and a preset correspondence, a target closed-loop power adjustment value corresponding to the target transmission mode, where the preset correspondence is a correspondence between the power adjustment indication information and a closed-loop power adjustment value.

With reference to the second aspect and the above implementations, in another implementation of the second aspect, the transmitting, by the network device, the uplink power control information to the terminal device includes: transmitting, by the network device, Downlink Control Information (DCI) to the terminal device, where the DCI includes the power adjustment indication information.

With reference to the second aspect and the above implementations, in another implementation of the second aspect, the target closed-loop power adjustment value is an adjustment value of the target transmitting power relative to first transmitting power, the first transmitting power is transmitting power used by the terminal device for transmitting an uplink signal of a same type as the target uplink signal for a previous time; or, the target closed-loop power adjustment value is an adjustment value of the target transmitting power relative to second transmitting power, the second transmitting power is transmitting power used by the terminal device for transmitting an uplink signal of a same type as the target uplink signal using the target transmission mode for a previous time; or, the target closed-loop power adjustment value is an adjustment value of the target transmitting power relative to third transmitting power, the third transmitting power is transmitting power—most recently determined by the terminal device—of an uplink signal of a same type as the target uplink signal; or, the target closed-loop power adjustment value is an adjustment value of the target transmitting power relative to fourth transmitting power, the fourth transmitting power is transmitting power—most recently determined by the terminal device—of an uplink signal which is transmitted using the target transmission mode and is of a same type as the target uplink signal; or, the target closed-loop power adjustment value is an adjustment value of the target transmitting power relative to fifth transmitting power, the fifth transmitting power is transmitting power of the target uplink signal determined by the terminal device according to the open-loop power control parameter corresponding to the target transmission mode.

With reference to the second aspect and the above implementations, in another implementation of the second aspect, the method further includes: receiving, by the network device, the target uplink signal transmitted by the terminal device using the target transmission mode and the target transmitting power.

With reference to the second aspect and the above implementations, in another implementation of the second aspect, the target uplink signal is one of the following signals: a Physical Uplink Shared Channel (PUSCH), a Physical Uplink Control Channel (PUCCH), an SRS, and a De Modulation Reference Signal (DMRS).

With reference to the second aspect and the above implementations, in another implementation of the second aspect, the target uplink multiple access mode is one of the following multiple access modes: Discrete Fourier Transform Spread Orthogonal Frequency Division Multiplexing (DFT-S-OFDM), Cyclic Prefix—Orthogonal Frequency Division Multiplexing (CP-OFDM), Single-Carrier Frequency-Division Multiple Access (SC-FDMA), and Orthogonal Frequency Division Multiple Access (OFDMA).

In a third aspect, a terminal device is provided for performing the method of the first aspect or any of the possible implementations of the first aspect described above. In particular, the terminal device includes functional modules for performing the method of the first aspect or any of the possible implementations of the first aspect described above.

In a fourth aspect, a network device is provided for performing the method of the second aspect or any of the possible implementations of the second aspect described above. In particular, the network device includes functional modules for performing the method of the second aspect or any of the possible implementations of the second aspect described above.

In a fifth aspect, a terminal device including a processor, a memory and a transceiver is provided. The processor, the memory and the transceiver communicate with each other through an internal connection path, transmitting control and/or data signals, such that the terminal device performs the method of the first aspect or any of the possible implementations of the first aspect described above.

In a sixth aspect, a network device including a processor, a memory and a transceiver is provided. The processor, the memory and the transceiver communicate with each other through an internal connection path, transmitting control and/or data signals, such that the network device performs the method of the second aspect or any of the possible implementations of the second aspect described above.

In a seventh aspect, a computer readable medium is provided for storing a computer program, the computer program including instructions for performing the method of the first aspect or any of the possible implementations of the first aspect described above.

In an eighth aspect, a computer readable medium is provided for storing a computer program, the computer program including instructions for performing the method of the second aspect or any of the possible implementations of the second aspect described above.

BRIEF DESCRIPTION OF DRAWINGS

FIG. 3 is a schematic flowchart of a method for controlling uplink power according to another embodiment of the present application;

FIG. 4 is another schematic flowchart of a method for controlling uplink power according to another embodiment of the present application;

DESCRIPTION OF EMBODIMENTS

Technical solutions in embodiments of the present application will be clearly and comprehensively described in the following with reference to the accompanying drawings.

It should be understood that the technical solutions of the embodiments of the present application can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS) or Worldwide Interoperability for Microwave Access (WiMAX) communication system, and 5G system or New Radio (NR) system.

In embodiments of the present application, a terminal device can include, but is not limited to, a mobile station (MS), a mobile terminal, a mobile telephone, user equipment (UE), a handset, portable equipment, and a vehicle, etc. The terminal device can communicate with one or more core networks via a Radio Access Network (RAN). For example, the terminal device can be a mobile telephone (or a cellular telephone), and a computer having wireless communication functions, etc. The terminal device can also be portable, pocket-sized, handheld, computer-integrated or in-vehicle mobile apparatuses.

In embodiments of the present application, a network device is an apparatus deployed in a radio access network to provide wireless communication functions for terminal devices. The network device can be a base station, and the base station can include various forms of macro base stations, micro base stations, relay stations, access points, and the like. In systems with different radio access technologies, the names of devices having base station functions may vary. For example, it is called an Evolved NodeB (eNB or eNodeB) in an LTE network, while it is called a Node B in a 3rd Generation (3G) network.

Uplink transmission in an LTE system only supports a Discrete Fourier Transform Spread Orthogonal Frequency Division Multiplexing (DFT-S-OFDM) multiple access mode, and only one set of uplink power control parameters needs to be configured on the network side for the uplink transmission, but currently two uplink multiple access modes (or referred to as uplink waveforms) are introduced in uplink transmission in a 5G system: a DFT-S-OFDM multiple access mode and a Cyclic Prefix (CP)-OFDM multiple access mode. The former can only be used for uplink single layer transmission, and the latter can be used for uplink single layer or multilayer transmission. Which multiple access mode a terminal device uses can be configured by the network side according to uplink channel quality of the terminal device. Generally, the DFT-S-OFDM multiple access mode has better channel transmission coverage performance, but lower spectrum efficiency. The CP-OFDM multiple access mode has higher spectral efficiency, but poorer coverage performance due to a higher Peak to Average Power Ratio (PAPR). When a terminal device uses different multiple access modes for uplink signal transmission, the required uplink transmitting power is different due to different coverage.

Moreover, when a terminal device uses different uplink beams to transmit uplink signals, the receiving power of a network device is different. Therefore, in order to avoid interference of the terminal device with other terminal devices, different transmitting power needs to be used for different uplink beams. Further, the efficiency of transmitting power needs to be improved in future communication systems, and therefore it is required to use different transmitting power for different precoding schemes. Further, two transmission scheduling schemes would be introduced in the future communication systems: uplink signal transmission scheduled by the network and spontaneous uplink signal transmission from a terminal device. The former is scheduled by uplink grant (UL Grant), and the latter does not require UL Grant for scheduling, where the terminal device spontaneously transmits the uplink signal when needed. In order to avoid interference from the spontaneous transmission of the terminal device with other devices, different transmitting power needs to be used for different transmission scheduling schemes.

However, existing methods for controlling uplink power in LTE cannot meet the requirements of different transmission modes. Therefore, embodiments of the present application provide a method for controlling uplink power, enabling a terminal device to calculate uplink transmitting power corresponding to each transmission mode by using an independent uplink power control process, and enabling flexible adjustment of uplink transmitting power to meet the requirements of different transmission modes.

It should be noted that, in embodiments of the present application, uplink transmission refers to a process in which a terminal device transmits a signal to a network device, and downlink transmission refers to a process in which a network device transmits a signal to a terminal device.

Figure 1:
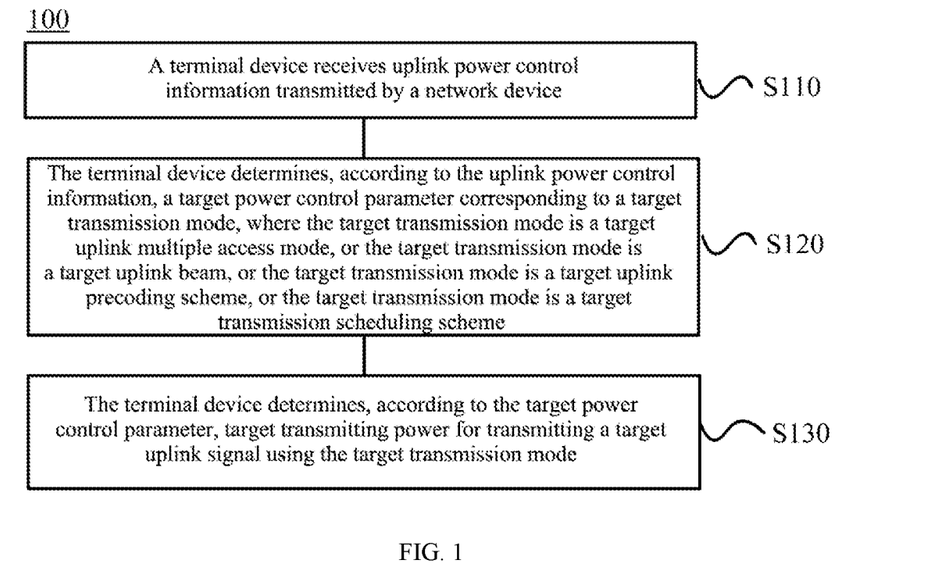
FIG. 1 is a schematic flowchart of a method for controlling uplink power according to an embodiment of the present application.

FIG. 1 illustrates a method for controlling uplink power according to an embodiment of the present application. As shown in FIG. 1, a method 100 includes:

S110: a terminal device receives uplink power control information transmitted by a network device;

S120: the terminal device determines a target power control parameter corresponding to a target transmission mode according to the uplink power control information, where the target transmission mode is a target uplink multiple access mode, or the target transmission mode is a target uplink beam, or the target transmission mode is a target uplink precoding scheme, or the target transmission mode is a target transmission scheduling scheme; and S130: the terminal device determines, according to the target power control parameter, target transmitting power for transmitting a target uplink signal using the target transmission mode.

According to the method for controlling uplink power provided by embodiments of the present application, the terminal device determines the target power control parameter corresponding to the target transmission mode according to the received uplink power control information transmitted by the network device. Therefore, when the terminal device uses different transmission modes for uplink signal transmission, an independent uplink power control process can be used to determine the uplink transmitting power corresponding to the transmission mode. The uplink transmitting power can be flexibly adjusted to meet the requirements of different transmission modes, and the method is suitable for a communication system supporting multiple transmission modes.

Specifically, when the terminal device transmits uplink signals using different uplink multiple access modes, an independent uplink power control process can be used to determine uplink transmitting power corresponding to different uplink multiple access modes. The uplink transmitting power can be flexibly adjusted to meet the requirements of different uplink access modes, and the method is suitable for a communication system supporting multiple transmission modes.

Or, when the terminal device transmits uplink signals using different uplink beams, an independent uplink power control process can be used to determine uplink transmitting power corresponding to different uplink beams, which meets the requirements of different uplink beams, and can control the interference of the terminal device with other terminal devices. In embodiments of the present application, the terminal device transmitting the target uplink signal using the target uplink beam refers to that the terminal device performs beamforming on the target uplink signal using a beamforming vector corresponding to a target uplink beam mode.

Or, when the terminal device transmits uplink signals using different precoding schemes, an independent uplink power control process can be used to determine uplink transmitting power corresponding to different precoding schemes, which meets the requirements of different precoding schemes, enables different precoding schemes with different transmitting power, and improves the efficiency of transmitting power under the premise of ensuring performance. In embodiments of the present application, a precoding scheme includes single port transmission, transmit diversity, spatial multiplexing, open-loop precoding, quasi-open-loop precoding, closed-loop precoding, and the like.

Or, when the terminal device transmits uplink signals using different transmission scheduling schemes, an independent uplink power control process can be used to determine uplink transmitting power corresponding to different transmission scheduling schemes, which meets the requirements of different transmission scheduling schemes, and can avoid the interference from spontaneous uplink transmission of the terminal device with other terminal devices.

It should be noted that, after the terminal device determines, according to the target power control parameter, the target transmitting power for transmitting the target uplink signal using the target transmission mode, it is possible to use the target transmission mode and the target transmitting power to transmit the target uplink signal at the current time, or it is also possible not to use the target transmission mode to transmit the target uplink signal at the current time. When the terminal device does not use the target transmission mode to transmit the target uplink signal at the current time, the terminal device may store the determined target transmitting power, and when the target transmission mode is used to actually transmit a target uplink signal, the determined target transmitting power is used to transmit the target uplink signal.

Moreover, the target transmission mode can be one of multiple candidate transmission modes that may be used by the terminal device to transmit the target uplink signal. In this case, the terminal device determines a power control parameter corresponding to each candidate transmission mode according to the uplink power control information transmitted by the network device. Or, the target transmission mode is a transmission mode required for the terminal device to transmit the target uplink signal. In this case, the terminal device can determine the target transmission mode according to transmission indication information configured by the network side. For example, the target transmission mode may be explicitly indicated by a signaling, for example, a Radio Resource Control (RRC) message or Downlink Control Information (DCI). Or the target transmission mode may be implicitly indicated by other information, for example, different DCI formats correspond to different transmission modes.

In an embodiment of the present application, the target transmission mode is one of multiple transmission modes. For example, when the target transmission mode is a target uplink multiple access mode, the target uplink multiple access mode is one of multiple uplink multiple access modes. For example, the target uplink multiple access mode is one of the following multiple access modes: Fourier Transform Spread Orthogonal Frequency Division Multiplexing (DFT-S-OFDM) Cyclic Prefix (CP)-OFDM, Single-Carrier Frequency-Division Multiple Access (SC-FDMA), and Orthogonal Frequency Division Multiple Access Orthogonal Frequency Division Multiple Access (OFDMA). Or, when the target transmission mode is a target uplink beam, the target uplink beam is one of multiple uplink beams. Or, when the target transmission mode is a target uplink precoding scheme, the target uplink precoding scheme is one of multiple precoding schemes. Or, when the target transmission mode is a target transmission scheduling scheme, the target transmission scheduling scheme is one of multiple transmission scheduling schemes.

In an embodiment of the present application, the uplink power control information includes open-loop power control information, and the open-loop power control information includes open-loop power control parameters corresponding to multiple transmission modes including the target transmission mode. The terminal device determines, according to the open-loop power control information, a target open-loop power control parameter corresponding to the target transmission mode from the open-loop power parameters.

Specifically, the open-loop power control information includes open-loop power control parameters corresponding to multiple uplink multiple access modes, and/or the open-loop power control information includes open-loop power control parameters corresponding to multiple uplink beams, and/or the open-loop power control information includes open-loop power control parameters corresponding to multiple target uplink precoding schemes, and/or the open-loop power control information includes open-loop power control parameters corresponding to multiple transmission scheduling schemes.

As an example, the target open-loop power control parameter includes at least one of the following parameters: uplink objective receiving power, a path loss factor, and a Sounding Reference Signal (SRS) power adjustment value.

As an example, the terminal device receives the open-loop power control information which is transmitted by the network device through an RRC message. The network device separately configures respective open-loop power control parameter for different transmission modes (for example, different uplink multiple access modes) through the open-loop power control information.

Specifically, in some embodiments, the network device can configure a complete open-loop power control parameter for one transmission mode, and configure offset values relative to the open-loop power control parameter corresponding to the one transmission mode for other transmission modes, thereby saving the overhead of downlink signaling. Taking the transmission mode being an uplink multiple access mode as an example, the network device configures target uplink receiving power corresponding to the DFT-S-OFDM to be −60 dBm, and configures an offset value for target uplink receiving power corresponding to the CP-OFDM relative to the target uplink receiving power corresponding to the DFT-S-OFDM to be 10 dBm.

Or, in some embodiments, the network device configures a complete open-loop power control parameter for each transmission mode. Taking the transmission mode being an uplink multiple access mode as an example, the network device configures target uplink receiving power corresponding to the DFT-S-OFDM to be −60 dBm with a path loss factor being 1, and configures target uplink receiving power corresponding to the CP-OFDM to be 20 dBm with a path loss factor being 2. When the terminal device determines to transmit the target uplink signal using one of the uplink multiple access modes, the transmitting power of the target uplink signal is calculated according to the open-loop power control parameter corresponding to the determined uplink multiple access mode.

In an embodiment of the present application, the uplink power control information includes power adjustment indication information, and the terminal device determines a target closed-loop power adjustment value corresponding to the target transmission mode according to the power adjustment indication information and a preset correspondence, where the preset correspondence is a correspondence between the power adjustment indication information and the closed-loop power adjustment value.

In some embodiments, the terminal device receives DCI transmitted by the network device, where the DCI includes the power adjustment indication information. Moreover, the DCI here may be DCI for scheduling target uplink signal transmission, or may be DCI dedicated to carrying the power adjustment indication information, where the DCI is not used for scheduling transmission of the target uplink signal.

As an example, the foregoing preset correspondence may be pre-determined by the terminal device and the network device, or may be configured for the terminal device by the network device through indication information. The preset correspondence can be shown in Table 1. It should be noted that Table 1 merely gives an example of the preset correspondence, rather than setting a limitation on the preset correspondence.

TABLE 1

| Value of an indication field of power adjustment indication information in DCI | Closed-loop power adjustment value (in dB) |
| --- | --- |
| 00 | −1 |
| 01 | 0 |
| 10 | 1 |
| 11 | 3 |

In embodiments of the present application, for different transmission modes, a closed-loop power adjustment value indicated by the same indication field in the power adjustment indication information may be different. Therefore, the terminal device needs to determine a target correspondence from the preset correspondence according to the target transmission mode, and then determine the target closed-loop power adjustment value according to the power adjustment indication information and the target correspondence. For example, for different uplink multiple access modes, a correspondence between the power adjustment indication information and the closed-loop power adjustment value may be pre-determined by the terminal device and the network device, or may be configured for the terminal device by the network device through indication information. For example, Table 2 shows another correspondence between the power adjustment indication information and the closed-loop power adjustment value.

TABLE 2

| Value of an indication field of power adjustment indication information in DCI | Closed-loop power adjustment value for DFT-S-OFDM (in dB) | Closed-loop power adjustment value for CP-OFDM (in dB) |
| --- | --- | --- |
| 00 | −1 | −0.5 |
| 01 | 0 | 0 |
| 10 | 1 | 0.5 |
| 11 | 3 | 1.5 |

In an embodiment of the present application, the target closed-loop power adjustment value may be an absolute value adjusted based on open-loop power, or may be an accumulated value adjusted based on previous transmitting power. The network device may configure, by signaling, the target closed-loop power adjustment value for the terminal device, to be either an absolute value adjusted based on the open-loop power or an accumulated value adjusted based on the previous transmitting power.

Specifically, in some embodiments, the target closed-loop power adjustment value is an adjustment value of the target transmitting power relative to first transmitting power, the first transmitting power is transmitting power used by the terminal device transmitting an uplink signal of the same type as the target uplink signal for the previous time. For example, the target closed-loop power adjustment value may be an adjustment value of transmitting power for a Physical Uplink Shared Channel (PUSCH) to be transmitted by the terminal device relative to transmitting power for the PUSCH transmitted by the terminal device for the previous time.

Or, the target closed-loop power adjustment value is an adjustment value of the target transmitting power relative to second transmitting power, the second transmitting power is transmitting power used by the terminal device for transmitting an uplink signal of the same type as the target uplink signal using the target transmission mode for the previous time. For example, the target closed-loop power adjustment value is an adjustment value of transmitting power for the PUSCH to be transmitted by the terminal device using DFT-S-OFDM relative to transmitting power for the PUSCH transmitted by the terminal device using the DFT-S-OFDM for the previous time.

Or, the target closed-loop power adjustment value is an adjustment value of the target transmitting power relative to third transmitting power, the third transmitting power is transmitting power—most recently determined by the terminal device—of an uplink signal of the same type as the target uplink signal. For example, the target closed-loop power adjustment value is an adjustment value of transmitting power for the PUSCH to be transmitted by the terminal device relative to most recently calculated transmitting power for the PUSCH. This does not mean that the terminal device needs to actually transmit the PUSCH when updating the transmitting power, but the terminal device will store the most recently calculated transmitting power for the PUSCH for subsequent PUSCH transmission.

Or, the target closed-loop power adjustment value is an adjustment value of the target transmitting power relative to fourth transmitting power, the fourth transmitting power is transmitting power—most recently determined by the terminal device—of an uplink signal which is transmitted using the target transmission mode and is of the same type as the target uplink signal. For example, the target power adjustment value is an adjustment value of transmitting power for the PUSCH to be transmitted by the terminal device using DFT-S-OFDM relative to the most recently calculated (or most recently updated) transmitting power for the PUSCH transmitted using DFT-S-OFDM. This does not mean that the terminal device needs to actually transmit the PUSCH when updating the transmitting power, but the terminal device will store the most recently calculated transmitting power for the PUSCH for subsequent PUSCH transmission.

Or, the target power adjustment value is an adjustment value of the target transmitting power relative to fifth transmitting power, the fifth transmitting power is transmitting power of the target uplink signal which is determined by the terminal device according to an open-loop power control parameter corresponding to the target transmission mode. The open-loop power control parameter here may be a parameter configured by the network device through upper layer signaling, such as objective receiving power and a path loss factor. The terminal device can calculate the transmitting power according to formula (1) and the open-loop power control parameter.

$$P_{PUSCH}(i) = 10 \log_{10}(M_{PUSCH}(i)) + P_{O\_PUSCH}(j) + \alpha(j) \cdot PL + \Delta_{TF}(i) \quad (1)$$

Here, $M_{PUSCH}(i)$ is uplink transmission bandwidth, $P_{O\_PUSCH}(I)$ is the objective receiving power, $\alpha(i)$ is the path loss factor, PL is a downlink path loss, $\Delta_{IF}(i)$ is an adjustment value related to Modulation and Coding Scheme (MCS).

In the foregoing embodiments, the terminal device can determine the target open-loop power control parameter corresponding to the target transmission mode according to the open-loop power control parameters respectively configured by the network device for different transmission modes through higher layer signaling, and determine the target closed-loop power adjustment value corresponding to the target transmission mode according to the power adjustment indication information carried by the network device through DCI. The terminal device then calculates the target transmitting power according to the target open-loop power control parameter, the target closed-loop power adjustment value, and a preset transmitting power calculation method or formula.

Figure 2:
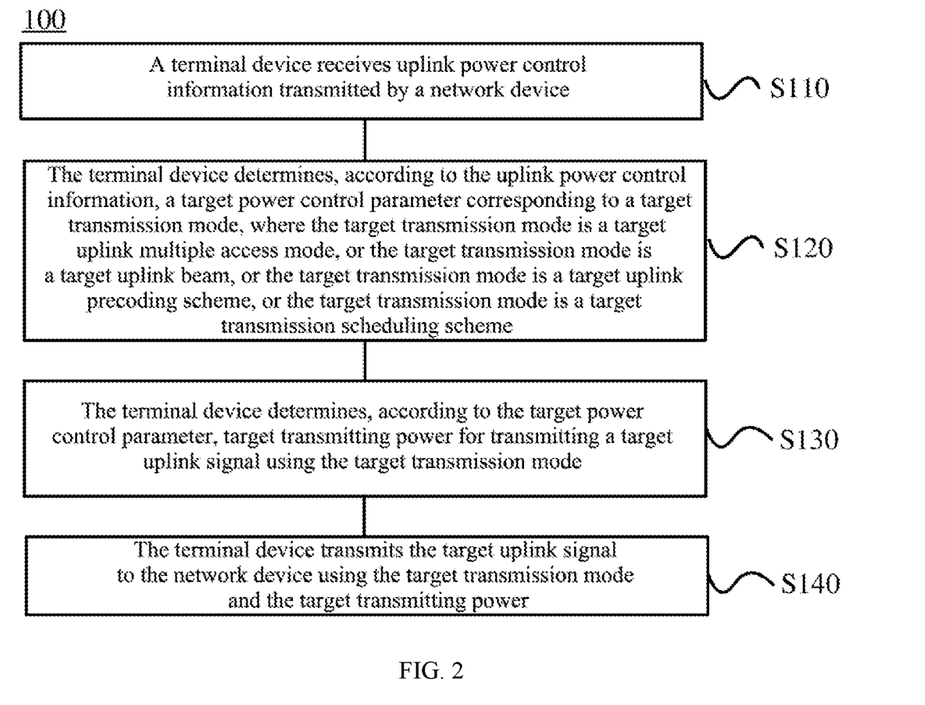
FIG. 2 is another schematic flowchart of a method for controlling uplink power according to an embodiment of the present application.

Further, after the terminal device determines the target transmitting power, as shown in FIG. 2, the method 100 further includes:

S140: the terminal device transmits the target uplink signal to the network device using the target transmission mode and the target transmitting power.

As an example, in all the foregoing embodiments, the target uplink signal is one of the following signals: a PUSCH, a Physical Uplink Control Channel (PUCCH), an SRS, and a De Modulation Reference Signal (DMRS).

The method for controlling uplink power according to embodiments of the present application is described in detail above from the view of a terminal device side with reference to FIG. 1 and FIG. 2, and the method for controlling uplink power according to embodiments of the present application will be described in detail below from the view of a network device side with reference to FIG. 3 and FIG. 4. It should be understood that the interaction between the network device and the terminal device described on the network device side is the same as that described on the terminal device side. To avoid repetition, related description is omitted as appropriate.

FIG. 3 shows a method for controlling uplink power according to another embodiment of the present application. As shown in FIG. 3, a method 200 includes:

S210: a network device determines uplink power control information, where the uplink power control information is used for a terminal device to determine a target power control parameter corresponding to a target transmission mode, and to determine, according to the target power control parameter, target transmitting power for transmitting a target uplink signal using the target transmission mode, where the target transmission mode is a target uplink multiple access mode, or the target transmission mode is a target uplink beam, or the target transmission mode is a target uplink precoding scheme, or the target transmission mode is a target transmission scheduling scheme;

S220: the network device transmits the uplink power control information to the terminal device.

Therefore, according to the method for controlling uplink power in embodiments of the present application, the network device transmits the uplink power control information to the terminal device, so that the terminal device can determine the target power control parameter corresponding to the target transmission mode according to the received uplink power control information. Therefore, when the terminal device uses different transmission modes for uplink signal transmission, an independent uplink power control process can be used to determine the uplink transmitting power corresponding to the transmission mode. The uplink transmitting power can be flexibly adjusted to meet the requirements of different transmission modes, and the method is suitable for a communication system supporting multiple transmission modes.

In an embodiment of the present application, the target transmission mode is one of multiple transmission modes.

In an embodiment of the present application, the target transmission mode is one of multiple candidate transmission modes for the terminal device to transmit the target uplink signal; or the target transmission mode is a transmission mode required for the terminal device to transmit the target uplink signal.

In an embodiment of the present application, the uplink power control information includes open-loop power control information, where the open-loop power control information includes open-loop power control parameters corresponding to multiple transmission modes including the target transmission mode, and the open-loop power control information is used for the terminal device to determine a target open-loop power control parameter corresponding to the target transmission mode from the open-loop power control parameters.

In an embodiment of the present application, S220 specifically includes that the network device transmits the open-loop power control information to the terminal device through a Radio Resource Control (RRC) message.

In an embodiment of the present application, the target open-loop power control parameter includes at least one of the following parameters: uplink objective receiving power, a path loss factor, and a Sounding Reference Signal (SRS) power adjustment value.

In an embodiment of the present application, the uplink power control information includes power adjustment indication information, where the power adjustment indication information is used for the terminal device to determine, according to the power adjustment indication information and a preset correspondence, a target closed-loop power adjustment value corresponding to the target transmission mode, where the preset correspondence is a correspondence between the power adjustment indication information and a closed-loop power adjustment value.

In an embodiment of the present application, S120 specifically includes that the network device transmits Downlink Control Information (DCI) to the terminal device, where the DCI includes the power adjustment indication information.

In an embodiment of the present application, the target closed-loop power adjustment value is an adjustment value of the target transmitting power relative to first transmitting power, where the first transmitting power is transmitting power used by the terminal device for transmitting an uplink signal of the same type as the target uplink signal for the previous time; or, the target closed-loop power adjustment value is an adjustment value of the target transmitting power relative to second transmitting power, where the second transmitting power is transmitting power used by the terminal device for transmitting an uplink signal of the same type as the target uplink signal using the target transmission mode for the previous time; or, the target closed-loop power adjustment value is an adjustment value of the target transmitting power relative to third transmitting power, where the third transmitting power is transmitting power, which is most recently determined by the terminal device, of an uplink signal of the same type as the target uplink signal; or, the target closed-loop power adjustment value is an adjustment value of the target transmitting power relative to fourth transmitting power, where the fourth transmitting power is transmitting power, which is most recently determined by the terminal device, of an uplink signal which is transmitted using the target transmission mode and is of the same type as the target uplink signal; or, the target closed-loop power adjustment value is an adjustment value of the target transmitting power relative to fifth transmitting power, where the fifth transmitting power is transmitting power of the target uplink signal determined by the terminal device according to the open-loop power control parameter corresponding to the target transmission mode.

In an embodiment of the present application, as shown in FIG. 4, the method 200 further includes:

S230: the network device receives the target uplink signal transmitted by the terminal device using the target transmission mode and the target transmitting power.

In an embodiment of the present application, the target uplink signal is one of the following signals: a Physical Uplink Shared Channel (PUSCH), a Physical Uplink Control Channel (PUCCH), an SRS, and a De Modulation Reference Signal (DMRS).

In an embodiment of the present application, the target uplink multiple access mode is one of the following multiple access modes: Discrete Fourier Transform Spread Orthogonal Frequency Division Multiplexing (DFT-S-OFDM), Cyclic Prefix—Orthogonal Frequency Division Multiplexing (CP-OFDM), Single-Carrier Frequency-Division Multiple Access (SC-FDMA), and Orthogonal Frequency Division Multiple Access (OFDMA).

Figure 5:
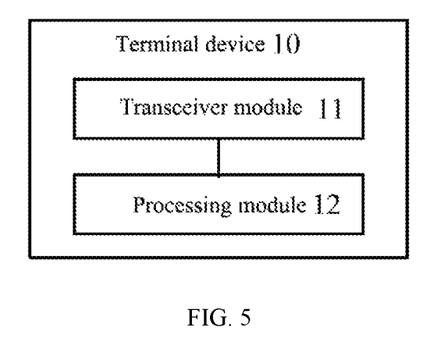
FIG. 5 is a schematic block diagram of a terminal device according to an embodiment of the present application.

The method for controlling uplink power according to embodiments of the present application is described in detail above with reference to FIG. 1 to FIG. 4. The terminal device according to embodiments of the present application will be described in detail below with reference to FIG. 5. As shown in FIG. 5, a terminal device 10 includes:

a transceiver module 11 configured to receive uplink power control information transmitted by a network device;

a processing module 12 configured to determine, according to the uplink power control information, a target power control parameter corresponding to a target transmission mode, where the target transmission mode is a target uplink multiple access mode, or the target transmission mode is a target uplink beam, or the target transmission mode is a target uplink precoding scheme, or the target transmission mode is a target transmission scheduling scheme;

the processing module 12 is further configured to determine, according to the target power control parameter, target transmitting power for transmitting a target uplink signal using the target transmission mode.

Therefore, the terminal device according to embodiments of the present application determines the target power control parameter corresponding to the target transmission mode according to the received uplink power control information transmitted by the network device. Therefore, when the terminal device uses different transmission modes for uplink signal transmission, an independent uplink power control process can be used to determine the uplink transmitting power corresponding to the transmission mode. The uplink transmitting power can be flexibly adjusted to meet the requirements of different transmission modes, and the terminal device is suitable for a communication system supporting multiple transmission modes.

In an embodiment of the present application, the target transmission mode is one of multiple transmission modes.

In an embodiment of the present application, the target transmission mode is one of multiple candidate transmission modes for the terminal device to transmit the target uplink signal; or the target transmission mode is a transmission mode required for the terminal device to transmit the target uplink signal.

In an embodiment of the present application, the uplink power control information includes open-loop power control information, where the open-loop power control information includes open-loop power control parameters corresponding to multiple transmission modes including the target transmission mode;

where the processing module 12 is specifically configured to: determine, according to the open-loop power control information, a target open-loop power control parameter corresponding to the target transmission mode from the open-loop power control parameters.

In an embodiment of the present application, the transceiver module 11 is specifically configured to: receive the open-loop power control information that is transmitted by the network device through a Radio Resource Control (RRC) message.

In an embodiment of the present application, the target open-loop power control parameter includes at least one of the following parameters: uplink objective receiving power, a path loss factor, and a Sounding Reference Signal (SRS) power adjustment value.

In an embodiment of the present application, the uplink power control information includes power adjustment indication information;

where the processing module 12 is specifically configured to: determine, according to the power adjustment indication information and a preset correspondence, a target closed-loop power adjustment value corresponding to the target transmission mode, where the preset correspondence is a correspondence between the power adjustment indication information and a closed-loop power adjustment value.

In an embodiment of the present application, the processing module 12 is specifically configured to: determine a target correspondence from the preset correspondence according to the target transmission mode; and determine the target closed-loop power adjustment value according to the power adjustment indication information and the target correspondence.

In an embodiment of the present application, the transceiver module 11 is specifically configured to: receive Downlink Control Information (DCI) transmitted by the network device, where the DCI includes the power adjustment indication information.

In an embodiment of the present application, the target closed-loop power adjustment value is an adjustment value of the target transmitting power relative to first transmitting power, where the first transmitting power is transmitting power used by the terminal device for transmitting an uplink signal of the same type as the target uplink signal for the previous time; or, the target closed-loop power adjustment value is an adjustment value of the target transmitting power relative to second transmitting power, where the second transmitting power is transmitting power used by the terminal device for transmitting an uplink signal of the same type as the target uplink signal using the target transmission mode for the previous time; or, the target closed-loop power adjustment value is an adjustment value of the target transmitting power relative to third transmitting power, where the third transmitting power is transmitting power, which is most recently determined by the terminal device, of an uplink signal of the same type as the target uplink signal; or, the target closed-loop power adjustment value is an adjustment value of the target transmitting power relative to fourth transmitting power, where the fourth transmitting power is transmitting power, which is most recently determined by the terminal device, of an uplink signal which is transmitted using the target transmission mode and is of the same type as the target uplink signal; or, the target closed-loop power adjustment value is an adjustment value of the target transmitting power relative to fifth transmitting power, where the fifth transmitting power is transmitting power of the target uplink signal determined by the terminal device according to the open-loop power control parameter corresponding to the target transmission mode.

In an embodiment of the present application, the transceiver module 11 is further configured to: transmit the target uplink signal to the network device using the target transmission mode and the target transmitting power.

In an embodiment of the present application, the target uplink signal is one of the following signals: a Physical Uplink Shared Channel (PUSCH), a Physical Uplink Control Channel (PUCCH), an SRS, and a De Modulation Reference Signal (DMRS).

In an embodiment of the present application, the target uplink multiple access mode is one of the following multiple access modes: Discrete Fourier Transform Spread Orthogonal Frequency Division Multiplexing (DFT-S-OFDM), Cyclic Prefix—Orthogonal Frequency Division Multiplexing (CP-OFDM), Single-Carrier Frequency-Division Multiple Access (SC-FDMA), and Orthogonal Frequency Division Multiple Access (OFDMA).

The terminal device according to embodiments of the present application may refer to the process corresponding to the method 100 in embodiments of the present application, and the respective units/modules in the terminal device and other operations and/or functions described above are respectively to implement the corresponding processes in the method 100. For the sake of brevity, they will not be repeated here.

Figure 6:
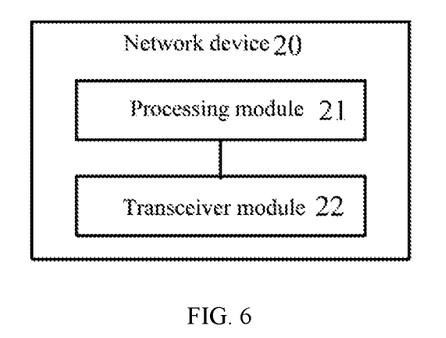
FIG. 6 is a schematic block diagram of a network device according to an embodiment of the present application.

FIG. 6 shows a network device according to an embodiment of the present application. As shown in FIG. 6, a network device 20 includes:

a processing module 21 configured to determine uplink power control information, where the uplink power control information is used for the terminal device to determine a target power control parameter corresponding to a target transmission mode and to determine, according to the target power control parameter, target transmitting power for transmitting a target uplink signal using the target transmission mode, where the target transmission mode is a target uplink multiple access mode, or the target transmission mode is a target uplink beam, or the target transmission mode is a target uplink precoding scheme, or the target transmission mode is a target transmission scheduling scheme; and a transceiver module 22 configured to transmit the uplink power control information to the terminal device.

Therefore, the network device according to embodiments of the present application transmits the uplink power control information to the terminal device, so that the terminal device can determine the target power control parameter corresponding to the target transmission mode according to the received uplink power control information. Therefore, when the terminal device uses different transmission modes for uplink signal transmission, an independent uplink power control process can be used to determine the uplink transmitting power corresponding to the transmission mode. The uplink transmitting power can be flexibly adjusted to meet the requirements of different transmission modes, and the network device is suitable for a communication system supporting multiple transmission modes.

In an embodiment of the present application, the target transmission mode is one of multiple transmission modes.

In an embodiment of the present application, the target transmission mode is one of multiple candidate transmission modes for the terminal device to transmit the target uplink signal, or the target transmission mode is a transmission mode required for the terminal device to transmit the target uplink signal.

In an embodiment of the present application, the uplink power control information includes open-loop power control information, where the open-loop power control information includes open-loop power control parameters corresponding to multiple transmission modes including the target transmission mode, and the open-loop power control information is used for the terminal device to determine a target open-loop power control parameter corresponding to the target transmission mode from the open-loop power control parameters.

In an embodiment of the present application, the transceiver module 22 is specifically configured to: transmit the open-loop power control information to the terminal device through a Radio Resource Control (RRC) message.

In an embodiment of the present application, the target open-loop power control parameter includes at least one of the following parameters: uplink objective receiving power, a path loss factor, and a Sounding Reference Signal (SRS) power adjustment value.

In an embodiment of the present application, the uplink power control information includes power adjustment indication information, where the power adjustment indication information is used for the terminal device to determine a target closed-loop power adjustment value corresponding to the target transmission mode according to the power adjustment indication information and a preset correspondence, where the preset correspondence is a correspondence between the power adjustment indication information and a closed-loop power adjustment value.

In an embodiment of the present application, the transceiver 22 module is specifically configured to: transmit Downlink Control Information (DCI) to the terminal device, where the DCI includes the power adjustment indication information.

In an embodiment of the present application, the target closed-loop power adjustment value is an adjustment value of the target transmitting power relative to first transmitting power, where the first transmitting power is transmitting power used by the terminal device for transmitting an uplink signal of the same type as the target uplink signal for the previous time; or, the target closed-loop power adjustment value is an adjustment value of the target transmitting power relative to second transmitting power, where the second transmitting power is transmitting power used by the terminal device for transmitting an uplink signal of the same type as the target uplink signal using the target transmission mode for the previous time; or, the target closed-loop power adjustment value is an adjustment value of the target transmitting power relative to third transmitting power, where the third transmitting power is transmitting power, which is most recently determined by the terminal device, of an uplink signal of the same type as the target uplink signal; or, the target closed-loop power adjustment value is an adjustment value of the target transmitting power relative to fourth transmitting power, where the fourth transmitting power is transmitting power, which is most recently determined by the terminal device, of an uplink signal which is transmitted using the target transmission mode and is of the same type as the target uplink signal; or, the target closed-loop power adjustment value is an adjustment value of the target transmitting power relative to fifth transmitting power, where the fifth transmitting power is transmitting power of the target uplink signal determined by the terminal device according to the open-loop power control parameter corresponding to the target transmission mode.

In an embodiment of the present application, the transceiver module 22 is further configured to: receive the target uplink signal transmitted by the terminal device using the target transmission mode and the target transmitting power.

In an embodiment of the present application, the target uplink signal is one of the following signals: a Physical Uplink Shared Channel (PUSCH), a Physical Uplink Control Channel (PUCCH), an SRS, and a De Modulation Reference Signal (DMRS).

In an embodiment of the present application, the target uplink multiple access mode is one of the following multiple access modes: Discrete Fourier Transform Spread Orthogonal Frequency Division Multiplexing (DFT-S-OFDM), Cyclic Prefix—Orthogonal Frequency Division Multiplexing (CP-OFDM), Single-Carrier Frequency-Division Multiple Access (SC-FDMA), and Orthogonal Frequency Division Multiple Access (OFDMA).

The network device according to embodiments of the present application may refer to the process corresponding to the method 200 in embodiments of the present application, and the respective units/modules in the network device and the foregoing other operations and/or functions are to respectively implement the corresponding processes in the method 200. For the sake of brevity, they will not be repeated here.

Figure 7:
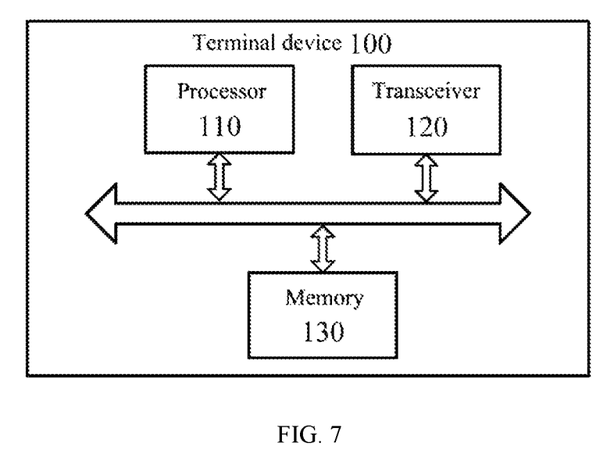
FIG. 7 is a schematic block diagram of a terminal device according to another embodiment of the present application.

FIG. 7 shows a terminal device according to another embodiment of the present application. As shown in FIG. 7, a terminal device 100 includes a processor 110 and a transceiver 120. The processor 110 is connected to the transceiver 120. In an embodiment, the terminal device 100 further includes a memory 130, and the memory 130 is connected to the processor 110. The processor 110, the memory 130, and the transceiver 120 can communicate with each other through an internal connection path. The transceiver 120 is configured to receive uplink power control information transmitted by a network device, and the processor 110 is configured to: determine, according to the uplink power control information, a target power control parameter corresponding to a target transmission mode, where the target transmission mode is a target uplink multiple access mode, or the target transmission mode is a target uplink beam, or the target transmission mode is a target uplink precoding scheme, or the target transmission mode is a target transmission scheduling scheme; and determine, according to the target power control parameter, target transmitting power for transmitting a target uplink signal using the target transmission mode.

Therefore, the terminal device according to embodiments of the present application determines the target power control parameter corresponding to the target transmission mode according to the received uplink power control information transmitted by the network device. Therefore, when the terminal device uses different transmission modes for uplink signal transmission, an independent uplink power control process can be used to determine the uplink transmitting power corresponding to the transmission mode. The uplink transmitting power can be flexibly adjusted to meet the requirements of different transmission modes, and the terminal device is suitable for a communication system supporting multiple transmission modes.

The terminal device 100 according to embodiments of the present application may refer to the terminal device 10 in embodiments of the present application, and the respective units/modules in the terminal device and other operations and/or functions described above are respectively to implement the corresponding processes in the method 100. For the sake of brevity, they will not be repeated here.

Figure 8:
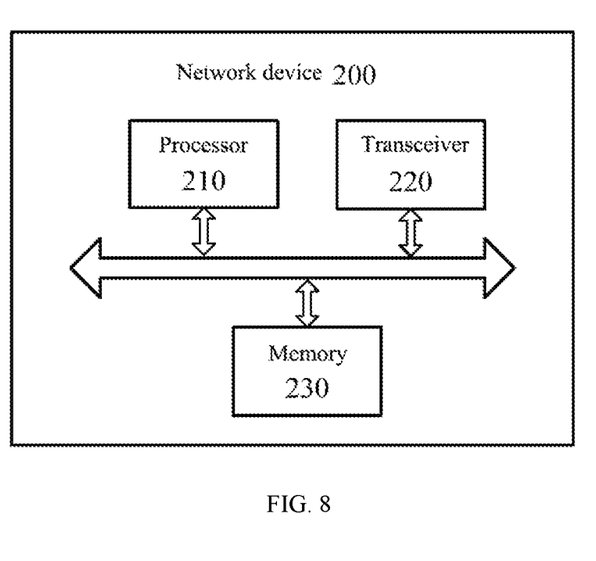
FIG. 8 is a schematic block diagram of a network device according to another embodiment of the present application.

FIG. 8 shows a schematic block diagram of a network device according to another embodiment of the present application. As shown in FIG. 8, a network device 200 includes a processor 210 and a transceiver 220. The processor 210 is connected to the transceiver 220. The network device 200 further includes a memory 230, and the memory 230 is connected to the processor 210. The processor 210, the memory 230, and the transceiver 220 can communicate with each other through an internal connection path. The processor 210 is configured to determine uplink power control information, where the uplink power control information is used for the terminal device to determine a target power control parameter corresponding to a target transmission mode and to determine, according to the target power control parameter, target transmitting power for transmitting a target uplink signal using the target transmission mode, where the target transmission mode is a target uplink multiple access mode, or the target transmission mode is a target uplink beam, or the target transmission mode is a target uplink precoding scheme, or the target transmission mode is a target transmission scheduling scheme; the transceiver 220 is configured to transmit the uplink power control information to the terminal device.

Therefore, the network device according to embodiments of the present application transmits the uplink power control information to the terminal device, so that the terminal device can determine the target power control parameter corresponding to the target transmission mode according to the received uplink power control information. Therefore, when the terminal device uses different transmission modes for uplink signal transmission, an independent uplink power control process can be used to determine the uplink transmitting power corresponding to the transmission mode. The uplink transmitting power can be flexibly adjusted to meet the requirements of different transmission modes, and the network device is suitable for a communication system supporting multiple transmission modes.

The network device 200 according to embodiments of the present application may refer to the network device 20 in embodiments of the present application, and the respective units/modules in the network device and the foregoing other operations and/or functions are respectively to implement the corresponding processes in the method 200. For the sake of brevity, they will not be repeated here.

It can be understood that the processor in embodiments of the present application may be an integrated circuit chip with signal processing capability. The processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, and discrete hardware components, which can implement or execute the methods, steps, and logical block diagrams disclosed in the embodiments of the present application. The general-purpose processor may be a microprocessor or the processor may be any conventional processor or the like.

The memory in embodiments of the present application may be a volatile memory or a non-volatile memory, or may include both volatile and non-volatile memories. The non-volatile memory may be a Read-Only Memory (ROM), a Programmable ROM (PROM), an Erasable PROM (EPROM), or an Electrically EPROM (EEPROM) or flash memory. The volatile memory may be a Random Access Memory (RAM) that acts as an external cache. By way of example but not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It should be noted that the memories of the systems and methods described herein are intended to include, without being limited to, these and any other suitable types of memories.

Persons of ordinary skill in the art will appreciate that elements and steps of various examples described with reference to the embodiments disclosed herein can be implemented in electronic hardware or a combination of computer software and electronic hardware. Whether these functions are performed in hardware or software depends on the specific application and design constraints of the solution. A person skilled in the art can use a different method for implementing the described functions for each particular application, but such implementation should not be considered to go beyond the scope of the present application.

A person skilled in the art can clearly understand that for the convenience and brevity of the description, the specific working process of the systems, the devices and the units described above can refer to the corresponding process in the above method embodiments, and details are not described herein.

In the several embodiments provided by the present application, it should be understood that the disclosed systems, devices, and methods may be implemented in other manners. For example, embodiments of the device described above are merely illustrative. For example, the division of the unit is only a division in logical functions. In actual implementation, there may be another division manner, for example, multiple units or components may be combined or may be integrated into another system, or some features may be ignored or not executed. In addition, the coupling or direct coupling or communication connection shown or discussed herein may be an indirect coupling or communication connection through some interfaces, devices or units, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solutions of the embodiments.

In addition, the functional units in embodiments of the present application may be integrated into one processing unit, or the units may exist physically separately, or two or more units may be integrated into one unit.

The functions may be stored in a computer readable storage medium if implemented in the form of a software functional unit and sold or used as a standalone product. Based on such understanding, the technical solution of the present application essentially, or the part making contributions relative to the prior art, or certain part of the technical solution, may be embodied in the form of a software product stored in a storage medium, including some instructions used to cause a computer device (which may be a personal computer, a server, or a network device, etc.) to perform all or part of the steps of the methods described in various embodiments of the present application. The foregoing storage medium includes various mediums that can store program codes, such as a U disk, a mobile hard disk, a Read-Only Memory (ROM), a Random Access Memory (RAM), a magnetic disk, an optical disk, or the like.

The above description are only specific implementations of the present application, the protection scope of the present application is not limited thereto, and any person skilled in the art can easily think of changes or substitutions within the technical scope disclosed in the present application, which should be covered by the scope of the present application. Therefore, the scope of the present application should be defined by the scope of the claims.

What is claimed is:

1. A method for controlling uplink power, comprising:
   receiving, by a terminal device, uplink power control information transmitted by a network device, wherein the uplink power control information comprises open-loop power control information, and the open-loop power control information comprises open-loop power control parameters corresponding to multiple uplink beams comprising the target uplink beam;
   determining, by the terminal device, according to the uplink power control information, a target power control parameter corresponding to the target uplink beam; and
   determining, by the terminal device, according to the target power control parameter, target transmitting power for transmitting a target uplink signal using the target uplink beam;

wherein the determining, by the terminal device, according to the uplink power control information, the target power control parameter corresponding to the target uplink beam comprises:
determining, by the terminal device, according to the open-loop power control information, a target open-loop power control parameter corresponding to the target uplink beam from the open-loop power control parameters.

2. The method according to claim 1, wherein the target uplink beam is one of multiple candidate target uplink beams for the terminal device to transmit the target uplink signal; or the target uplink beam is an uplink beam required for the terminal device to transmit the target uplink signal.

3. The method according to claim 1, wherein the target open-loop power control parameter comprises at least one of following parameters: uplink objective receiving power, a path loss factor, and a Sounding Reference Signal (SRS) power adjustment value.

4. The method according to claim 1, further comprising:
transmitting, by the terminal device, the target uplink signal to the network device using the target uplink beam and the target transmitting power.

5. The method according to claim 1, wherein the target uplink signal is one of following signals: a Physical Uplink Shared Channel (PUSCH), a Physical Uplink Control Channel (PUCCH), an SRS, and a De Modulation Reference Signal (DMRS).

6. A terminal device, comprising a processor, a memory and a transceiver, the processor, the memory and the transceiver communicating with each other through an internal connection path, wherein:
the transceiver is configured to receive uplink power control information transmitted by a network device, wherein the uplink power control information comprises open-loop power control information, and the open-loop power control information comprises open-loop power control parameters corresponding to multiple uplink beams comprising a target uplink beam;
the processor is configured to determine, according to the uplink power control information, a target power control parameter corresponding to the target uplink beam; and determine, according to the target power control parameter, target transmitting power for transmitting a target uplink signal using the target uplink beam;
wherein the processor is configured to: determine, according to the open-loop power control information, a target open-loop power control parameter corresponding to the target uplink beam from the open-loop power control parameters.

7. The terminal device according to claim 6, wherein the target uplink beam is one of multiple candidate uplink beams for the terminal device to transmit the target uplink signal; or the target uplink beam is an uplink beam required for the terminal device to transmit the target uplink signal.

8. The terminal device according to claim 6, wherein the target open-loop power control parameter comprises at least one of following parameters: uplink objective receiving power, a path loss factor, and a Sounding Reference Signal (SRS) power adjustment value.

9. The terminal device according to claim 6, wherein the transceiver is further configured to: transmit the target uplink signal to the network device using the target uplink beam and the target transmitting power.

10. The terminal device according to claim 6, wherein the target uplink signal is one of following signals: a Physical Uplink Shared Channel (PUSCH), a Physical Uplink Control Channel (PUCCH), an SRS, and a De Modulation Reference Signal (DMRS).

11. A network device, comprising a processor, a memory and a transceiver, the processor, the memory and the transceiver communicating with each other through an internal connection path, wherein:
the processor is configured to determine uplink power control information, wherein the uplink power control information is used for a terminal device to determine a target power control parameter corresponding to a target uplink beam and to determine, according to the target power control parameter, target transmitting power for transmitting a target uplink signal using the target uplink beam; and
the transceiver is configured to transmit the uplink power control information to the terminal device;
wherein the uplink power control information comprises open-loop power control information, the open-loop power control information comprises open-loop power control parameters corresponding to multiple uplink beams comprising the target uplink beam, and the open-loop power control information is used for the terminal device to determine a target open-loop power control parameter corresponding to the target uplink beam from the open-loop power control parameters.

12. The network device according to claim 11, wherein the target uplink beam is one of multiple candidate uplink beams for the terminal device to transmit the target uplink signal; or the target uplink beam is an uplink beam required for the terminal device to transmit the target uplink signal.

13. The network device according to claim 11, wherein the target open-loop power control parameter comprises at least one of following parameters: uplink objective receiving power, a path loss factor, and a Sounding Reference Signal (SRS) power adjustment value.

14. The network device according to claim 11, wherein the transceiver is further configured to: receive the target uplink signal transmitted by the terminal device using the target uplink beam and the target transmitting power.

15. The network device according to claim 11, wherein the target uplink signal is one of following signals: a Physical Uplink Shared Channel (PUSCH), a Physical Uplink Control Channel (PUCCH), an SRS, and a De Modulation Reference Signal (DMRS).

* * * * *